United States Patent

Ueffinger

[11] Patent Number: 5,951,842
[45] Date of Patent: Sep. 14, 1999

[54] PROCESS FOR MONITORING THE ELECTROLYTE CIRCULATION IN AN ELECTROLYSIS CELL

[75] Inventor: Gerhard Ueffinger, Weinstadt-Grossheppach, Germany

[73] Assignee: Eastman Kodak Company, Rochester, N.Y.

[21] Appl. No.: 09/010,670

[22] Filed: Jan. 22, 1998

[30] Foreign Application Priority Data

Feb. 3, 1997 [DE] Germany .......................... 197 03 900

[51] Int. Cl.$^6$ .................................................. C25B 15/02
[52] U.S. Cl. ...................... 205/337; 205/335; 205/349; 205/771
[58] Field of Search .................... 205/335, 337, 205/349, 771, 743, 744, 793.5; 204/232, 233, 234

[56] References Cited

U.S. PATENT DOCUMENTS

| | | | |
|---|---|---|---|
| 4,675,085 | 6/1987 | Vasquez .............................. | 205/337 |
| 5,254,226 | 10/1993 | Williams et al. ...................... | 205/335 |
| 5,282,934 | 2/1994 | Cox .................................... | 205/335 |
| 5,435,894 | 7/1995 | Hayakawa et al. ..................... | 205/744 |
| 5,480,769 | 1/1996 | Ueffinger et al. ..................... | 205/335 |
| 5,614,067 | 3/1997 | Okazaki ............................... | 204/233 |
| 5,783,060 | 7/1998 | LaRiviere et al. ..................... | 205/337 |

*Primary Examiner*—Bruce F. Bell
*Attorney, Agent, or Firm*—Frank Pincelli

[57] ABSTRACT

A process for monitoring the electrolyte circulation in an electrolysis cell, in which an electrolyte flow generated by a circulation pump is generated between the electrodes of the electrolysis cell and the electrolysis is performed by a constant electrolysis current or electrode potential. The process includes the steps of setting at least three different electrolysis states in the cell by a switching on and off of the circulation pump and the electrolysis current or the voltage at predetermined times; performing multiple measurements of at least one electrolysis parameter in a predetermined period of time and forming a mean value of the measured electrolyte parameter for each of the three electrolysis states; forming of a first gradient ST1 from the mean values of the electrolysis parameters of the first and second electrolysis states and forming a second gradient ST2 from the mean values of the electrolysis parameters of the second and third electrolysis states; and comparing the gradient ST1 with the absolute value of the gradient ST2, where a greatly reduced electrolyte circulation applies with ST1<|ST2|, which is indicated as an error signal by a visual or acoustic signal element.

9 Claims, 2 Drawing Sheets

PROCESS FOR MONITORING THE ELECTROLYTE CIRCULATION IN AN ELECTROLYSIS CELL

FIELD OF THE INVENTION

The present invention relates to a process for monitoring the electrolyte circulation in an electrolysis cell, in particular for silver recovery from photographic solutions, in which an electrolyte flow generated by a circulation pump is generated between the electrodes of the electrolysis cell and the electrolysis is performed by a constant electrolysis current or electrode potential.

BACKGROUND OF THE INVENTION

When performing electrolysis in the field of metal recovery from aqueous solutions, it is essential for an adequate circulation to take place at the surfaces of the electrodes, as explained below.

When an electrode is dipped into an electrolyte, a so-called phase boundary layer usually forms. It is known in theory that first an inner boundary layer, the so-called inner Helmholtz surface, is formed, which is nearest to the electrode. It is formed mainly from the molecules of the solvent. Solvated ions can only penetrate through to this first boundary layer. They themselves thereby form a second layer, the so-called outer Helmholtz surface. The interaction between the charged metal of the electrode and the solvated ions takes place only via long-ranged electrostatic forces. A layer is therefore formed away from the electrode and into the solution, which is called the diffusion layer. The thickness of this layer depends on the ion concentration of the solution. This electrode/liquid boundary layer can be aptly described as a capacitor. As in a capacitor, here too the capacitance and the charge are linked to a voltage. If a current is now passed through an electrochemical cell, then this voltage at least must be exceeded before any current flow can come about. If there is then a current flow through a cell, the metal is deposited onto the cathode. The transfer of metal ions to the cathode is caused by three different effects:

a) migration under the influence of the electrical field;

b) diffusion through the concentration gradient; and c) convection by circulation of the electrolyte liquid at the electrode, surface.

In metal recovery by means of electrolysis, the metal ions are now taken away from the vicinity of the cathode and deposited as metal atoms when the appropriate charge is received. This results in a depletion of these metal ion species near the cathode. If the convection largely fails, then the processes a) and b) are substantially responsible for ion transport. Both processes generally transport the ions in a substantially less effective way than convection. A boundary layer of increasing thickness is formed in which the concentration of the ions to be deposited decreases and leads to an increase in the potential with a constant current. If the potential is kept constant, the electrolysis current drops, and hence by a considerable extent the metal recovery rate too. If, however, the current is injected from the outside as a constant current, then other ions assume the charge transport, and unwelcome oxidation and reduction processes occur at the electrodes. Furthermore, the efficiency of the metal recovery process drops even further.

The recovery of silver from photographic fixing bath solution is taken as an example here. When a current is switched on, the silver ions are deposited on the cathode as solid silver metal while absorbing an electron. With the three processes described above, new silver ions are brought to the cathode. If convection fails, i.e. no liquid flow at the cathode surface, this leads to a depletion of silver ions at the cathode surface. If the outer potential is kept constant, the current drops and the recovery rate is considerably reduced. If the current is kept constant, then the potential increases and unwelcome chemical reactions result, such as the formation of silver sulfide, the oxidation of sulfite at the anode or sulfur precipitation. In the final analysis, the fixing bath becomes unusable, which is not tolerable for silver recovery with a circulation system. The circulation of the electrolyte at the electrode surface therefore results in a reduction of the diffusion layer. The better the circulation, the better the metal deposition on the cathode. The fundamental electrochemical effects are described in, for example: "Electrochemical Methods", A. J. Bard, L. R. Faulkner, John Wiley & Sons, New York, 1980.

According to the prior art, there is either no monitoring of the electrolyte circulation (high risk) or the monitoring is performed indirectly by mechanical or electromechanical equipment such as:

flow monitors, which for example trigger an alarm when the flow in the supply or discharge lines to the electrolysis cell is interrupted;

flow meters, for defining a minimum throughput rate below which an alarm is triggered;

thermal flow monitors; or inductive flow meters, for obtaining a precise and dependable measurement of the throughput.

Generating the convection in the electrolysis cell using a circulation pump and monitoring it in various ways is also known.

For example, an interface for a silver recovery unit for detecting the operating state of at least one pump is known from DE 195 09 757 A1. A sensor for detection of the operating state of the pump is installed outside the pump such that during the installation any interference with the electronic control unit of the pump or with the pump itself is avoidable. The output signal of the sensor is passed to a downstream electronic circuit comprising a series connection of an amplifier means, a first filter means, a rectifier means, a second filter means and a comparator.

All these methods have in common that they do not inquire about the presence or absence of a flow on the spot, i.e. directly at the electrode. Furthermore, the aforementioned mechanical or electromechanical monitoring equipment is expensive and therefore often not usable for simple silver recovery equipment.

SUMMARY OF THE INVENTION

An object underlying the present invention is to monitor the circulation of an electrolyte in an electrolysis cell dependably and inexpensively in a way that leads to an error already being indicated while there is still circulation inside the cell, which however does not meet the above requirements for whatever reason.

The process has, with the use of a constant electrolysis current, the advantage that it is generally independent of the current voltage value being set by the electrolysis cell. This means that it does not matter which cell voltage is set. It has become evident that when a new cathode is used or when the fixing bath is changed while a constant current is in use, the voltages are generally different. Voltage losses also play no part in the supply lines to the electrodes. With a fixed electrolysis current, therefore, the absolute voltage cannot be used for determining the electrolyte circulation, since the latter depends on the aforementioned effects; instead it is advantageous only to evaluate the voltage change.

The process also has the advantage, when a constant electrode potential is used accordingly, that then only the current change being set has to be evaluated analogously to the above voltage change.

A further advantage obtained is that no moving parts are required for implementation of the process. There are also no wear parts, no aging phenomena and no chemical effects on components that might affect the process. Recalibration or checking of the measuring equipment used is also not necessary.

The process is therefore substantially independent of the respective states of the electrolyte and of the electrodes.

The invention thus relates to a process for monitoring an electrolyte circulation in an electrolysis cell, in particular for silver recovery from photographic solutions, in which an electrolyte flow is generated by a circulation pump between electrodes of said electrolysis cell and an electrolysis is performed by a constant electrolysis current or electrode potential. The process comprises the steps of setting at least three different electrolysis states in the cell by switching on and off the circulation pump and the electrolysis current or voltage at predetermined times; performing multiple measurements of at least one electrolysis parameter in a predetermined period of time, and forming a mean value of the measured electrolyte parameter for each of the three electrolysis states; forming a first gradient ST1 from the mean values of the electrolysis parameters of the first and second electrolysis states and forming a second gradient ST2 from the mean values of the electrolysis parameters of the second and third electrolysis states; and comparing the first gradient ST1 with an absolute value of the second gradient ST2, wherein a greatly reduced electrolyte circulation applies with ST1 <|ST2|, which is indicated as an error

DETAILED DESCRIPTION OF THE INVENTION

Figure 1:
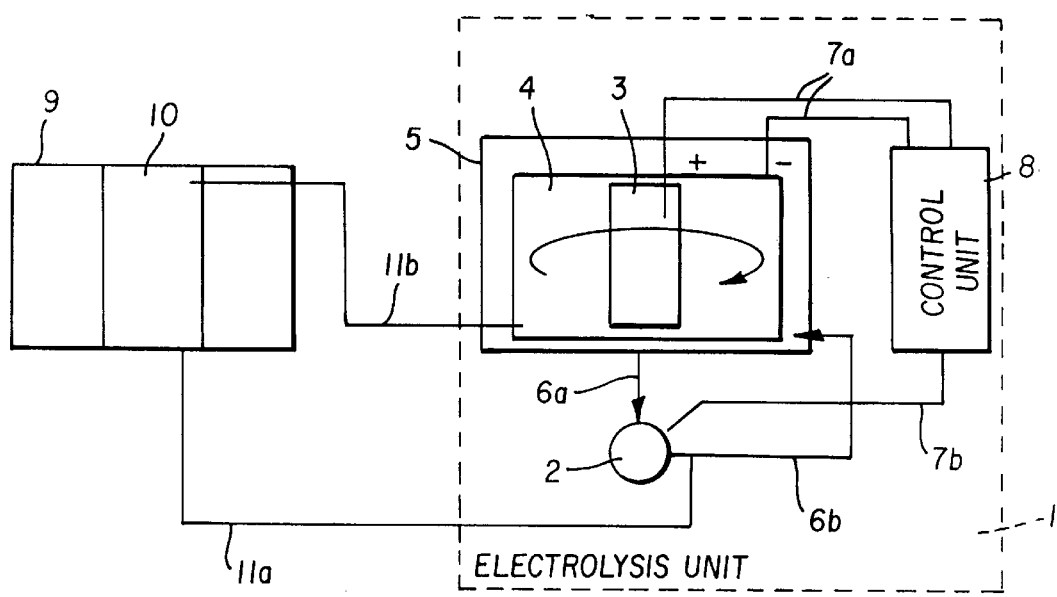
FIG. 1 illustrates an example for the use of the process in a connection of an electrolysis unit to a film developing machine.

Referring now to the drawings, FIG. 1 shows in diagrammatic form an electrolysis unit 1 in which circulation of fixing bath solution is continuously maintained between a fixing bath tank 10 of a developing machine 9 and the electrolysis unit 1. Using a circulation pump 2 of the electrolysis unit 1, part of the pumped electrolyte can be pumped back to the fixing bath tank 10 via a supply pipe 11a. The same flow rate is supplied via the overflow of the tank 10 by means of a return pipe 11b to an electrolysis cell 5. The silver is transferred in the fixing bath tank 10 from the photographic material to the solution, circulated into the electrolysis unit 1 and there deposited on the cathode 4 of the electrolysis cell 5. A control unit 8 monitors the recovery process, e.g. by measurement of the cell voltage across anode 3 and cathode 4. The circulation pump 2 in the electrolysis unit 1 ensures the necessary circulation in the electrolysis cell 5, e.g. via the two hose lines 6a and 6b. The cathode 4 and anode 3 shown diagrammatically in FIG. 1 are cylindrical in shape. The active surface of the cathode 4 is the inner surface of the cylinder, i.e. silver is deposited onto it. It should however be pointed out that the type of design of cathode and anode is not important, nor is the type of connection between the electrolysis unit and the developing machine, since the process is independent of them. The electrodes do not have to be cylinder-symmetrical, and instead can have any other form. What is important is that flow takes place at the electrode surfaces. As described above, a high flow is necessary at this surface in order to keep the diffusion layer as small as possible. The circular flow with this type of cathode/anode arrangement is shown by an arrow between anode 3 and cathode 4, and must be monitored by the present invention.

The control unit 8 comprises a current supply unit and can be designed with microprocessor or analog control. The current supply of the unit 8 delivers a DC current via the lines 7a to anode 3 and cathode 4, the polarities of which are (+) and (−) respectively. The cell voltage necessary for measurement between anode and cathode can be tapped directly in the control unit 8. The pump 2 is likewise supplied by the control unit 8 via the electrical line 7b and can also be switched on and off from there.

The process in accordance with the invention can be described as follows using a constant electrolysis current:

1st period: switching off of circulation pump 2 and electrolysis current for a certain period, preferably 1 minute. During this time, the capacitor "charged" by the electrolysis current is partially depleted, i.e. the boundary layer built up by the previously applied potential decreases. The cell voltage drops, partly because there is now no further voltage drop from the electrolyte and instead the potential is substantially determined only by the two electrode potentials. Shortly before the expiration of the preset time, the cell potential is measured several times and a first mean value M1, i.e. that of period 1, is obtained, e.g. 5 measured values in 5 seconds for mean value formation.

2nd period: a predetermined electrolysis current is switched on for a predetermined time without switching on the circulation pump. A cell potential now builds up very quickly that, because of the formation of a large boundary layer, is higher than the potential value normally applied during circulation. Just before expiration of this second period, a mean value M2 for the current voltage is again determined. The time of this 2nd period is determined substantially from the voltage curve, which must be determined by experimentation beforehand for a certain application. Immediately after switch-on of the current, the voltage increases rapidly, while the gradient of the curve decreases as the time proceeds. An advantageous time for application during silver electrolysis is 1 to 2 minutes; the constant current can be, for example, between 1 and 3 A, although this generally depends on the application.

3rd period: the circulation pump 2 is switched on for a third predetermined period, with the electrolysis current also remaining switched on. The commencement of the electrolyte flow reduces the boundary layer and silver ions are moved closer to the cathode 4 by convection. As a result, the cell voltage drops rapidly, while as time passes the now negative gradient of the curve decreases in its amount. It has been shown that approx. 30 seconds to 1 minutes are sufficient for this period. At the end of period 3, a mean value M3 for the cell voltage is again obtained.

Figure 2:
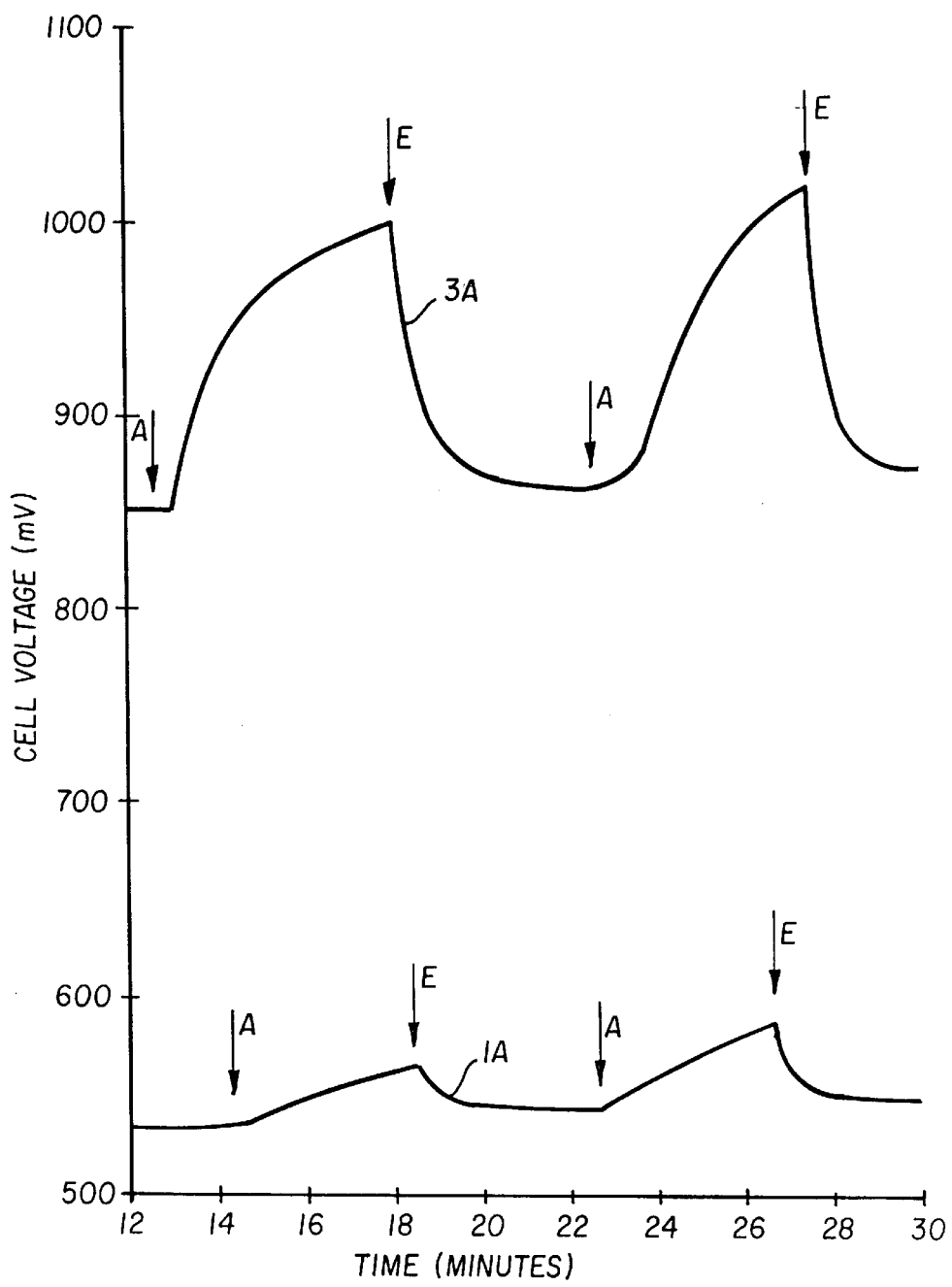
FIG. 2 illustrates an electrolysis voltage curve over time for two different constant electrolysis currents.

Periods 2 and 3 are shown as examples in FIG. 2. They show typical curves with a current of 3 A when the pump is switched on and off at intervals of, for example, about 4 minutes. The switching times are identified by "E" (for ON) and "A" (for OFF). It can be seen clearly that the effect is much more pronounced with 3 A than with 1 A.

Evaluation in respect of the presence of an electrolyte flow sufficient for electrolysis is performed as follows:

Two gradients are obtained using the control unit 8: gradient 1 (ST1) from the 1st mean value (M1) and the 2nd mean value (M2), and the gradient 2 (ST2) from the 2nd (M2) and 3rd (M3) mean values. A criterion can be derived from these two gradients for deciding whether the circulation is sufficiently strong. The simplest criterion would be, for example, ST1>0 and ST2<0. For use in silver recovery the more stringent criterion of ST1<|ST2|(as the absolute value of the gradient ST2) has proved convenient. A greatly reduced flow will not meet this criterion. In this case, an error signal is generated by the control unit 8 that is indicated by an LED on the control unit 8. The electrolysis process is then interrupted by the control unit 8 by means of switch-off of the electrolysis current and of the circulation pump.

In addition, a check for possible errors in the electrolysis circuit can be made and any errors indicated:

In the transition from period 1 to 2, a marked increase in the cell voltage must take place. If this is not the case, the current may for example have found a way outside the electrolysis cell or there may have been a short-circuit.

The following applies as a sufficient criterion for error detection in this case:

| | |
|---|---|
| M2 − M1 > 50 mV | M2: cell voltage mean value from period 2 |
| | M1: cell voltage mean value from period 1 |
| | mV: millivolt |

If it is found that the above criterion is not met, an error signal (E2) is generated and electrolysis is interrupted or aborted, as already explained in the case of evaluation in respect of presence of an electrolyte flow sufficient for electrolysis.

The process can also be applied when the electrode potential is kept constant, such that the electrolysis current adjusts to suit the overall resistance of the system. In this case, the three electrolysis state changes to be effected in the cell 5 would for example be performable as follows:

1. Switch off cell voltage;
2. Switch on cell voltage without the circulation pump; the electrolysis current rises to a high value and then drops first quickly and then more slowly; the mean value is obtained from the currents at the start and end of the period;
3. Switch on circulation pump with the voltage switched on; the electrolysis current increases as the gradient decreases; the mean value is obtained from the currents at the end of the period;
4. Evaluation in respect of the presence of electrolyte circulation similarly to the above process with constant electrolysis current.

It is within the scope of the invention that the sequence of the described state changes of the electrolyte in the electrolysis cell does not have to be precisely in this way. For example, the process is also usable when a sequence as follows is selected:

1st period: circulation pump on, electrolysis current on
2nd period: circulation pump off, electrolysis current on
3rd period: circulation pump on, with the appropriate mean value formations for the individual periods using the currents and their evaluation using comparisons of the gradients, as described.

The frequency for checking the circulation of the electrolyte depends on the respective application (chemical property of the electrode surfaces, chemical composition of the electrolyte) and must be set accordingly. In the application electrolysis with silver recovery from photographic fixing baths, it has been shown that a first test, e.g. 2 hours after switch-on of the electrolysis unit, and further tests every 12 hours after that are sufficient.

The occurrence of the checks can preferably also be made dependent on the amount of silver recovered, e.g. after every 20 grams. The recovered metal mass can, for example, be calculated automatically by the control unit 8 from the parameters such as electrolysis time, current and efficiency.

The invention has been described in detail with particular reference to certain preferred embodiments thereof, but it will be understood that variations and modifications can be effected within the spirit and scope of the invention.

What is claimed is:

1. A process for monitoring an electrolyte circulation in an electrolysis cell, in which an electrolyte flow is generated by a circulation pump between electrodes of said electrolysis cell and an electrolysis is performed by a constant electrolysis current or electrode potential, the process comprising the steps of:

setting at least three different electrolysis states in the cell by switching on and off said circulation pump and said electrolysis current or voltage at predetermined times;

performing multiple measurements of at least one electrolysis parameter in a predetermined period of time, and forming a mean value of the measured electrolyte parameter for each of said three electrolysis states;

forming a first gradient ST1 from the mean values of said electrolysis parameters of said first and second electrolysis states and forming a second gradient ST2 from the mean values of said electrolysis parameters of said second and third electrolysis states; and comparing said first gradient ST1 with an absolute value of said second gradient ST2, wherein a greatly reduced electrolyte circulation applies with ST1<|ST2|, which is indicated as an error signal by a visual or acoustic signal element.

2. A process according to claim 1, wherein the at least one electrolysis parameter to be measured with constant electrolysis current is a voltage to be set between said electrodes.

3. A process according to claim 2, wherein said electrolysis current is between 1 and 3 A.

4. A process according to claim 1, wherein the at least one electrolysis parameter to be measured with constant electrode potential is the current flowing between said electrodes.

5. A process according to claim 1, wherein the electrolysis process is interrupted when said error signal is generated by switch-off of said circulating pump and of either said constant electrolysis current used or said constant electrode potential.

6. A process according to claim 1, wherein the electrolysis process is switched off upon meeting the criterion M2−M1>50 mV, wherein M2 is a cell voltage mean value from said first electrolysis state and M1 is a cell voltage mean value from the second electrolysis state.

7. A process according to claim 1, wherein said first electrolysis state of said cell is achieved with said circulation pump and said electrolysis current switched off, said second electrolysis state with said circulation pump switched off and said electrolysis current switched on, and said third electrolysis state with said circulation pump and said electrolysis current switched on.

8. A process according to claim 7, wherein the on/off switching sequence of the circulation pump and electrolysis current is interchangeable.

9. A process according to claim 1, wherein each of the at least three different electrolysis states is maintained for a period of between 30 and 180 seconds.

* * * * *